United States Patent
Kuroda et al.

(10) Patent No.: US 9,130,237 B2
(45) Date of Patent: Sep. 8, 2015

(54) RESTRAINED BATTERY MODULE MADE UP OF CELLS HAVING ROLLED ELECTRODE BODIES, AND METHOD OF MAKING THE SAME

(75) Inventors: Akira Kuroda, Toyota (JP); Sachio Takeda, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 341 days.

(21) Appl. No.: 12/294,476

(22) PCT Filed: Sep. 18, 2007

(86) PCT No.: PCT/IB2007/002691
§ 371 (c)(1),
(2), (4) Date: Sep. 25, 2008

(87) PCT Pub. No.: WO2008/035165
PCT Pub. Date: Mar. 27, 2008

(65) Prior Publication Data
US 2009/0202900 A1    Aug. 13, 2009

(30) Foreign Application Priority Data
Sep. 22, 2006    (JP) .................................. 2006-256809

(51) Int. Cl.
*H01M 2/10* (2006.01)
*H01M 10/0587* (2010.01)
(Continued)

(52) U.S. Cl.
CPC ............ *H01M 10/0431* (2013.01); *H01G 9/06* (2013.01); *H01G 9/26* (2013.01); *H01M 10/00* (2013.01); *H01M 10/0481* (2013.01);
(Continued)

(58) Field of Classification Search
CPC .................... H01M 10/0587; H01M 10/0481; H01M 10/0431; H01M 10/345; H01M 10/052
USPC ............................................. 429/156
See application file for complete search history.

(56) References Cited

U.S. PATENT DOCUMENTS

2006/0003221 A1*   1/2006   Yeo ................................. 429/94
2006/0008701 A1    1/2006   Kim et al.
(Continued)

FOREIGN PATENT DOCUMENTS

CN          1841834       10/2006
CN        101075692       11/2007
(Continued)

OTHER PUBLICATIONS

Matsuura, T., Machine translation of JP 2004227788 A, Aug. 2004.*
(Continued)

*Primary Examiner* — Sean P Cullen
(74) *Attorney, Agent, or Firm* — Finnegan, Henderson, Farabow, Garrett & Dunner, LLP (57) ABSTRACT

Each of battery cells (12) that constitute a battery module includes a flat-shaped rolled electrode body (30) formed by rolling a sheet-like anode collector (32) and a sheet-like cathode collector (34) along with a sheet-like separator, and a trailing edge (32E) of the sheet-like anode collector (32) and a trailing edge (34E) of the sheet-like cathode collector (34) are located at a position (30B) outside a portion of the rolled electrode body (30) which substantially receives a restraining load. The battery module, in which the restraining load is applied to the cells, achieves long service life while maintaining good output characteristics.

7 Claims, 7 Drawing Sheets

(51) Int. Cl.
*H01M 10/625* (2014.01)
*H01M 10/04* (2006.01)
*H01G 9/06* (2006.01)
*H01G 9/26* (2006.01)
*H01M 10/00* (2006.01)
*H01M 6/42* (2006.01)
*H01M 10/052* (2010.01)
*H01M 10/34* (2006.01)

(52) U.S. Cl.
CPC ............ *H01M10/0587* (2013.01); *H01M 6/42* (2013.01); *H01M 10/052* (2013.01); *H01M 10/345* (2013.01); *Y10T 29/49108* (2015.01)

(56) References Cited

U.S. PATENT DOCUMENTS

| | | |
|---|---|---|
| 2006/0222937 A1 | 10/2006 | Morimoto et al. |
| 2008/0280193 A1 | 11/2008 | Takagi et al. |
| 2011/0111275 A1 | 5/2011 | Kawase |

FOREIGN PATENT DOCUMENTS

| | | |
|---|---|---|
| JP | 9-219181 | 8/1997 |
| JP | 11-167929 | 6/1999 |
| JP | 2000-285953 | 10/2000 |
| JP | 2001-236937 | 8/2001 |
| JP | 2002-8708 | 1/2002 |
| JP | 2004-227788 | 8/2004 |
| JP | 2005-129383 | 5/2005 |
| JP | 2005-339930 | 12/2005 |
| JP | 2006-156392 | 6/2006 |
| JP | 2007-123009 A | 5/2007 |
| JP | 2007-311139 A | 11/2007 |
| JP | 2008-78008 A | 4/2008 |
| KR | 10-2006-0099028 | 9/2006 |

OTHER PUBLICATIONS

Kawai, K., Machine translation of JP 2005339930 A, Dec. 2005.*
Kawai, K., Human translation of JP 2005-339930 A, Dec. 2005.*
Japanese Office Action dated Dec. 3, 2008.
Notification of Reason(s) for Refusal, Japanese Application No. 2008-173147, dated Nov. 18, 2010.
Notification of Reason(s) for Refusal, Korean Appl cation No. 10-2008-7023722, dated Oct. 28, 2010.
U.S. Office Action for U.S. Appl. No. 13/001,462 dated May 14, 2012.
Office Action for U.S. Appl. No. 12/929,055 dated May 22, 2014.

* cited by examiner

RESTRAINED BATTERY MODULE MADE UP OF CELLS HAVING ROLLED ELECTRODE BODIES, AND METHOD OF MAKING THE SAME

CROSS-REFERENCE TO RELATED APPLICATIONS

This application is a national phase application of International Application No. PCT/IB2007/002691, filed Sep. 18, 2007, and claims the priority of Japanese Application No. 2006-256809, filed Sep. 22, 2006, the contents of both of which are incorporated herein by reference.

BACKGROUND OF THE INVENTION

1. Field of the Invention

The invention relates to a battery module in which a plurality of battery cells (secondary batteries) capable of charging and discharging are connected in series, a method of fabricating the battery module, and a vehicle having the battery module. More particularly, the invention is concerned with the construction of battery cells that constitute a battery module suitable for installation on a vehicle.

2. Description of the Related Art

Battery modules each constructed by connecting a plurality of battery cells in series are provided which use lightweight lithium-ion batteries having a high energy density or other secondary batteries or storage devices, such as capacitors, as the cells. It has been found increasingly important to use such battery modules as power supplies that can provide high power, more specifically, as power supplies to be installed on vehicles or power supplies for personal computers and portable terminals. In particular, a battery module in which a plurality of cells in the form of lightweight lithium-ion batteries having a high energy density are connected in series is expected to be used as a high-power power supply to be installed on a vehicle. As an electrode body mounted in each of the cells that constitute the battery module, a rolled electrode body formed by rolling a long-length sheet-like anode collector, a long-length sheet-like cathode collector and a long-length sheet-like separator(s) into a flat shape is used. For example, Japanese Patent Application Publication No. 11-167929 (JP-A-11-167929), Japanese Patent Application Publication No. 2000-285953 (JP-A-2000-285953) and Japanese Patent Application Publication No. 2002-8708 (JP-A-2002-8708) disclose secondary batteries (cells) having such flat-shaped rolled electrode bodies.

In the meantime, the battery module, when installed on a vehicle, such as an automobile, is mounted in a limited space, and is assumed to be used in conditions where vibrations occur; therefore, the battery module is assembled such that a large number of cells are arranged into an array, and are brought into a restrained condition. When the cells are held in the restrained condition, a substantial load is applied to the individual cells that constitute the battery module. Accordingly, the cells that constitute the battery module are desired to provide good charge-discharge characteristics and output characteristics and have long service life even in the condition where such a large load is applied to the cells.

SUMMARY OF THE INVENTION

It is an object of the invention to provide a battery module comprising a plurality of cells that are connected in series, more specifically, a battery module that includes a plurality of cells (electrode bodies) that achieve long service life while assuring good charge-discharge characteristics and high output characteristics. It is another object to provide a vehicle, such as an automobile, having the battery module as described above.

A first aspect of the invention relates to a battery module constructed such that a plurality of cells capable of charging and discharging are connected in series. Each of the cells includes a flat-shaped rolled electrode body formed by rolling a sheet-like anode collector and a sheet-like cathode collector along with a sheet-like separator. At least two of the cells that are adjacent to each other are arranged such that flat faces of the rolled electrode bodies included in the respective cells are opposed to each other, and are held in a restrained condition in which a restraining load is applied to the rolled electrode bodies in the direction of arrangement of the cells. In the rolled electrode body included in each of the above-indicated at least two cells, a trailing edge of the sheet-like anode collector (or anode collector sheet) located at the outside of the rolled electrode body and a trailing edge of the sheet-like cathode collector (or cathode collector sheet) located at the outside of the rolled electrode body are both positioned outside a portion of the rolled electrode body which substantially receives the restraining load.

In this specification, the term "cell" means each of storage devices that are connected in series to constitute the battery module, and the storage devices, if not particularly specified, include batteries of various compositions and capacitors. The term "secondary battery" refers generally to rechargeable batteries that can be repeatedly charged, including so-called storage batteries, such as lithium-ion batteries and nickel metal hydride (NiMH) batteries. The storage devices that constitute a lithium-ion battery are a typical example of the above-mentioned "cells", and a lithium-ion battery module composed of a plurality of such cells is a typical example of the "battery module" disclosed herein.

The trailing edges of the anode and cathode collector sheets as described above may cause a step or steps to be formed on the outer surface of the rolled electrode body. If such steps are formed in a portion of the rolled electrode body which substantially receives the restraining load (typically, any portion contained in the flat outer surfaces of the rolled electrode body), the pressure (surface pressure) applied to the rolled electrode body due to the restraining load may differ between the stepped portion(s) (where the sheet trailing edges are located) and other portions surrounding the stepped portion(s). The unevenness in the load pressure (surface pressure) may cause unevenness in the degree of application of the pressure to the interior of the rolled electrode body, which in turn causes uneven or non-uniform distribution of battery components, such as an electrolyte, within the rolled electrode body, resulting in deterioration in the cycle life performance (a property concerning changes in the capacity as a result of repeated charging and discharging) of the cell. In the battery module according to the first aspect of the invention, both of the trailing edges of the anode and cathode collector sheets are positioned outside the portion of the rolled electrode body which substantially receives the restraining load. Therefore, the restraining load pressure (surface pressure) can be evenly or uniformly applied to the rolled electrode body. Accordingly, the battery module thus constructed is free from the problems as described above, and achieves excellent cycle life performance and long service life.

In the rolled electrode body included in each of the above-indicated at least two cells, a trailing edge of the sheet-like separator (or separator sheet) located at the outside of the rolled electrode body may be positioned outside a portion of the rolled electrode body which substantially receives the restraining load. By positioning the trailing edge of the separator sheet as well as the trailing edges of the anode and cathode collector sheets outside the portion that substantially receives the restraining load, the restraining load pressure (surface pressure) can be uniformly applied to the rolled electrode body, and the battery module achieves further improved cycle life performance and long service life.

Also, a space holding plate may be disposed between adjacent ones of the above-indicated at least two cells, such that the space holding plate is held in a restrained condition in which the restraining load is applied to the space holding plate as well as the corresponding cells in the direction of arrangement of the cells. In this case, the trailing edge of the anode collector sheet and the trailing edge of the cathode collector sheet may be both positioned outside a portion of the rolled electrode body which can be pressed by the space holding plate. Similarly, the trailing edge of the separator sheet may be positioned outside the portion that can be pressed by the space holding plate. In the thus constructed battery module in which the cells are restrained in the direction of arrangement thereof while the space holding plate (spacer) is inserted and disposed between adjacent cells, the restraining load is applied in the direction of arrangement of the cells to the rolled electrode body of each cell via the corresponding space holding plates. In the battery module constructed as described above, none of the sheet trailing edges is positioned in the portion of the rolled electrode body that can be pressed by the space holding plates, and therefore, the load pressure (surface pressure) is uniformly applied to the portion pressed by the space holding plates. Accordingly, the battery module achieves long service life while assuring excellent cycle life performance, even in the presence of the space holding plates for holding each cell.

The trailing edge of the anode collector sheet and the trailing edge of the cathode collector sheet may be both positioned outside the opposed flat faces of the corresponding rolled electrode bodies. The trailing edge of the separator sheet may also be positioned outside the opposed flat faces. By placing the sheet trailing edges at the position as described above, the restraining load pressure (surface pressure) can be uniformly applied over the entire areas of the flat faces of the rolled electrode bodies.

The trailing edge of the anode collector sheet and the trailing edge of the cathode collector sheet may be both positioned in a corner portion formed between two flat faces as front and back faces of the rolled electrode body. The trailing edge of the separator sheet may also be positioned in the above-indicated corner portion. By positioning the sheet trailing edges in the corner portion as described above, a uniform restraining load pressure (surface pressure) can be easily applied over the entire areas of the flat faces of the rolled electrode body without being affected by the sheet trailing edges.

In the rolled electrode body included in each of the above-indicated at least two cells, a tape that fixes at least one of the trailing edge of the anode collector sheet, the trailing edge of the cathode collector sheet and the trailing edge of the separator sheet to an outer surface of the rolled electrode body may be positioned outside a portion of the rolled electrode body which substantially receives the restraining load. Like the sheet trailing edges as described above, the tape may cause a step to be formed on the outer surface of the rolled electrode body. In the battery module constructed as described above, the step formed by the tape is positioned outside the portion of the rolled electrode body which substantially receives the restraining load. Therefore, the restraining load pressure (surface pressure) is uniformly applied to the rolled electrode body even in the presence of the tape, and the battery module achieves long service life while assuring excellent cycle life performance.

In the rolled electrode body included in each of the above-indicated at least two cells, a leading edge of the sheet-like anode collector (or anode collector sheet) located on the center side of the rolled electrode body and a leading edge of the sheet-like cathode collector (or cathode collector sheet) located on the center side of the rolled electrode body may be both positioned outside a portion of the rolled electrode body which substantially receives the restraining load. Also, a leading edge of the sheet-like separator (or separator sheet) may be positioned outside the portion of the rolled electrode body which substantially receives the restraining load. By positioning the sheet leading edges as well as the sheet trailing edges outside the portion of the rolled electrode body which substantially receives the restraining load, the restraining load pressure applied to the rolled electrode body can be made uniform throughout the interior of the rolled electrode body, and the battery module achieves further improved cycle life performance and long service life.

A second aspect of the invention relates to a method of fabricating a battery module in which a plurality of cells capable of charging and discharging are connected in series. The method includes the steps of preparing at least two cells each having a flat-shaped rolled electrode body formed by rolling a sheet-like anode collector and a sheet-like cathode collector along with a sheet-like separator, and arranging the cells such that flat faces of the rolled electrode bodies included in adjacent ones of the cells are opposed to each other, while holding the cells in a restrained condition in which a restraining load is applied to the rolled electrode bodies in the direction of arrangement of the cells. In the rolled electrode body included in each of the above-indicated at least two cells, a trailing edge of the anode collector sheet located at the outside of the rolled electrode body and a trailing edge of the cathode collector sheet located at the outside of the rolled electrode body are both positioned outside a portion of the rolled electrode body which substantially receives the restraining load. Furthermore, a trailing edge of the separator sheet may be positioned outside the portion of the rolled electrode body which substantially receives the restraining load.

Also, the trailing edge of the anode collector sheet and the trailing edge of the cathode collector sheet may be both positioned outside the opposed flat faces of the corresponding rolled electrode bodies. Furthermore, the trailing edge of the separator sheet as well as the trailing edges of the anode and cathode collector sheets may be positioned outside the opposed flat faces. Also, the trailing edge of the anode collector sheet and the trailing edge of the cathode collector sheet may be both positioned in a corner portion (curved portion) formed between two flat faces as the front and back faces of the rolled electrode body. Furthermore, the trailing edge of the separator sheet as well as the trailing edges of the anode and cathode collector sheets may be positioned in a corner portion (curved portion) formed between two flat faces as the front and back faces of the rolled electrode body.

In the rolled electrode body included in each of the above-indicated at least two cells, where a tape is used for fixing at least one of the trailing edges of the anode and cathode collector sheets and the trailing edge of the separator sheet to the outer surface of the rolled electrode body, the tape may be positioned outside the portion of the rolled electrode body which substantially receives the restraining load. When constructing the rolled electrode body of each of the above-indicated at least two cell, the leading edge of the anode collector sheet and the leading edge of the cathode collector sheet may be positioned outside the portion of the rolled electrode body which substantially receives the restraining load. Furthermore, the leading edge of the separator sheet as well as the leading edges of the collector sheets may be positioned outside the portion of the rolled electrode body which substantially receives the restraining load. When the battery module including space holding plates is fabricated, the trailing edge of the anode collector sheet and the trailing edge of the cathode collector sheet may be both positioned outside a portion of the rolled electrode body which can be pressed by the space holding plates. Furthermore, the trailing edge of the separator sheet as well as the trailing edges of the collector sheets may be positioned outside the portion of the rolled electrode body which can be pressed by the space holding plates. According to the method of fabricating the battery module according to the second aspect of the invention, any of the battery modules as described above can be favorably fabricated.

A third aspect of the invention relates to a vehicle having the battery module according to the first aspect of the invention or the battery module fabricated according to the second aspect of the invention. The battery module installed on the vehicle according to the third aspect of the invention achieves long service life while assuring excellent cycle life performance.

BRIEF DESCRIPTION OF THE DRAWINGS

The foregoing and further features and advantages of the invention will become apparent from the following description of exemplary embodiments with reference to the accompanying drawings, wherein like numerals are used to represent like elements, and wherein.

DETAILED DESCRIPTION OF EXAMPLE EMBODIMENTS

In the following, one exemplary embodiment of the invention will be described. It is to be understood that matters (such as the construction of positive and negative electrodes and separators and methods of fabricating the same, method of restraining battery cells, and a method of installing a battery module on a vehicle) necessary to practice the present invention, other than matters (such as the construction of cells that constitute the battery module, the construction of a rolled electrode body and a method of fabricating the rolled body) particularly mentioned in this specification, can be regarded as design matters that are obvious to those skilled in the art and are based on the related art in the technical field concerned. The present invention can be practiced on the basis of the content of this specification and common technical knowledge of the field concerned. The battery module according to the invention has excellent cycle life performance and achieves long service life, as described above. Owing to these characteristics, the battery module of the invention can be favorably used, in particular, as a power supply for a motor (electric motor) installed on a vehicle, such as an automobile. Thus, the invention provides a vehicle (a typical example of which is an automobile, such as a hybrid car, electric car, or a fuel cell car, which is equipped with an electric motor) 1 that includes the battery module 10 as a power supply.

The battery module according to the embodiment of the invention consists principally of a plurality of cells in the form of secondary batteries capable of charging and discharging, and is constructed such that the plurality of cells are connected in series. The construction of each of the cells is not particularly limited. In some embodiments of the invention, the cells may be in the form of nickel metal hydride (NiMH) batteries, electric double layer capacitors, or the like. In the present embodiment of the invention, in particular, the cells are in the form of lithium-ion batteries. Since the lithium-ion cells are high-power secondary batteries having a high energy density, these cells can provide a high-performance battery module, in particular, a battery module to be installed on a vehicle. In the following, the invention will be described in detail with reference to the embodiment in which the lithium-ion batteries are employed by way of example as battery cells that constitute the battery module, although the construction of the battery module or cells is not particularly limited to that of the embodiment.

Figure 1:
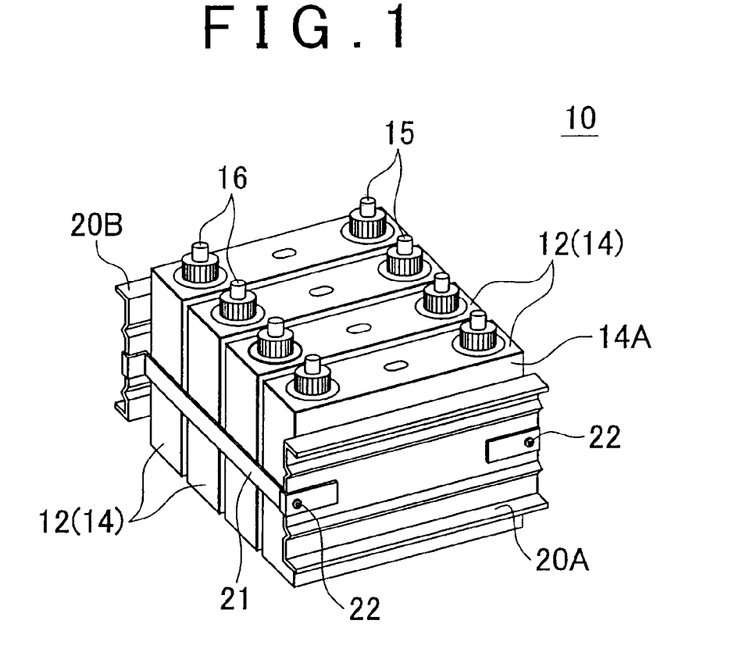
FIG. 1 is a perspective view schematically showing the construction of a battery module according to one embodiment of the invention.
Figure 2:
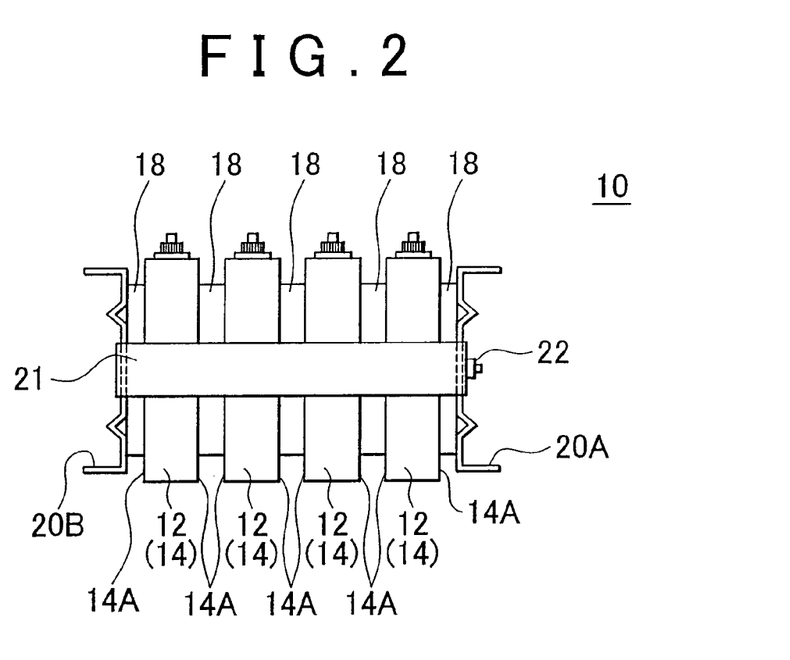
FIG. 2 is a side view schematically showing the construction of the battery module of FIG. 1.

Like the cells mounted in the battery modules of the related art, each of the cells that constitute the battery module typically includes a rolled electrode body having certain cell components or elements (e.g., respective active materials of the positive and negative electrodes, respective collectors of the positive and negative electrodes, separators and an electrolyte), and a container in which the electrode body is housed. As shown in FIG. 1 and FIG. 2 by way of example, the battery module 10 includes a plurality of (four in this embodiment) battery cells 12. Each of the cells 12 has a container 14 that is shaped (like a box in this embodiment) so as to receive a flat-shaped rolled electrode body which will be described later. The container 14 is provided with an external positive terminal 15 to which an anode collector of the rolled electrode body is electrically connected, and an external negative terminal 16 to which a cathode collector of the rolled electrode body is connected. Although not shown in the drawings, the external positive terminals 15 and external negative terminals 16 of the respective cells 12 are connected to each other in series, to thereby provide the battery module 10 of a desired voltage. While the container 14 may be provided with a safety valve, or the like, for releasing gas produced in the interior of the container 14, as is the case with the cells of the related art, the construction of the container 14, which does not characterize the invention, will not be described in detail.

The container 14 may be formed of a flexible material that allows the container 14 to be deformed in response to the above-mentioned restraining load pressure (surface pressure). In the present embodiment, for example, a container made of a metal and coated at its surface with a resin for insulation, or a container made of a polyolefin resin, such as polypropylene, or other synthetic resins, may be used as the container 14. In this embodiment of the invention, the container 14 may also be formed from a laminated film that has been used for exterior bodies of batteries in the related art. For example, the laminated film has a three-layer structure consisting of an outer surface layer (protective layer) made of a resin (such as polyethylene terephthalate, polytetrafluoroethylene, or polyamide resin) having a high melting point, a barrier layer (namely, a layer that can inhibit entry of gas and water) formed from a metal foil (such as aluminum or steel), and an adhesive layer made of a thermally fusible resin (such as ethylenevinyl acetate, or an olefin resin, such as polyethylene or polypropylene) having a relative low melting point.

As shown in FIG. 2, the cells 12 are arranged in an array such that large-width surfaces or major surfaces 14A (corresponding to flat faces of the rolled electrode bodies 30 contained in the containers 14) of the containers 14 of the adjacent cells 12 are opposed to each other. In addition, space holding plates (spacers) 18 having a suitable shape are disposed between adjacent cells 12 of the cell array and at the opposite outer sides of the outermost cells 12 as viewed in the direction of arrangement of the cells 12, such that the space holding plates 18 are in intimate contact with the corresponding major surfaces 14A of the containers 14. The material and/or shape of each of the space holding plates 18 may be selected so that the space holding plate 18 can function as a heat dissipating member for dissipating heat generated within each corresponding cell during use. For example, the space holding plate 18 may be made of a metal having high thermal conductivity, or may be shaped (like, for example, a comb) so that a cooling fluid (typically, air) can be introduced into space between adjacent cells.

As shown in FIG. 1 and FIG. 2, a restraining structure according to the present embodiment is provided around the array of the cells 12 and space holding plates 18 (which will be generically called "cell group"). More specifically, a pair of restraining plates 20A, 20B are disposed on the outer sides of the outermost space holding plates 18 disposed on the opposite outer sides of the cell group, as shown in FIG. 1 and FIG. 2, such that the restraining plates 20A, 20B are in intimate contact with the space holding plates 18. Also, a pair of fastening beams 21 are attached to the opposite side faces of the cell group so as to act as bridges between the pair of restraining plates 20A, 20B. As shown in FIG. 2, the end portions of the beams 21 are fastened and fixed to the restraining plates 20A, 20B with screws 22, so that the restraining plates 20A, 20B can restrain the cell group in the direction of arrangement of the cells.

Figure 4:
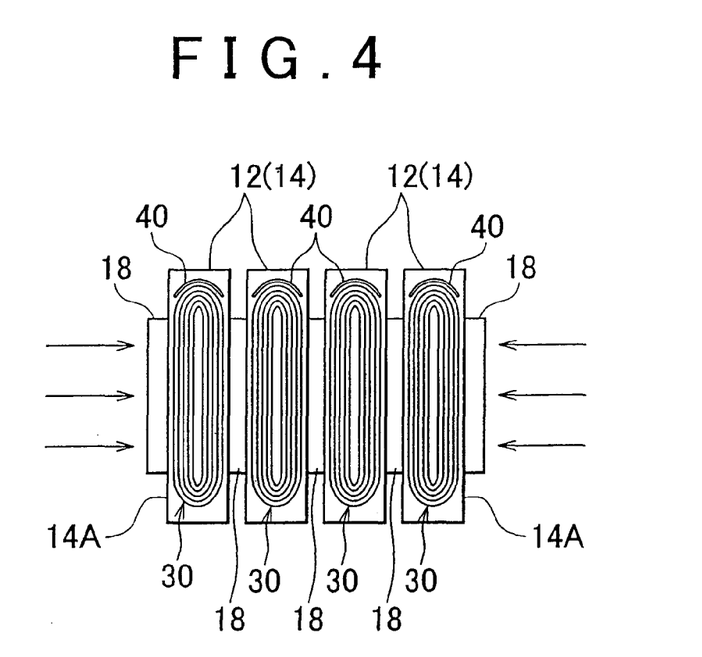
FIG. 4 is a cross-sectional view showing rolled electrode bodies housed in cell containers in a restrained condition as shown in FIG. 2.

Upon fastening of the beams 21 to the restraining plates 20A, 20B, restraining loads (surface pressures) whose level is commensurate with the degree of fastening by the beams 21 are applied to the container major surfaces 14A of the respective cells 12 in the fastening directions (i.e., the direction of cell arrangement) (see FIG. 4). In the present embodiment in which the space holding plates 18 are disposed between the adjacent cells 12 while closely contacting with the cells 12, portions of the major surfaces 14A of the cell containers 14 which are in contact with the space holding plates 18 are pressed by (i.e., receive surface pressures from) the space holding plates 18 when the cell group is subjected to the restraining loads. Since the containers 14 of this embodiment are flexible as described above, the loads (surface pressures) applied to the container major surfaces 14A are applied as they are to the flat faces or planes of the flat-shaped rolled electrode bodies 30 contained in the containers 14 (see FIG. 4).

Figure 3:
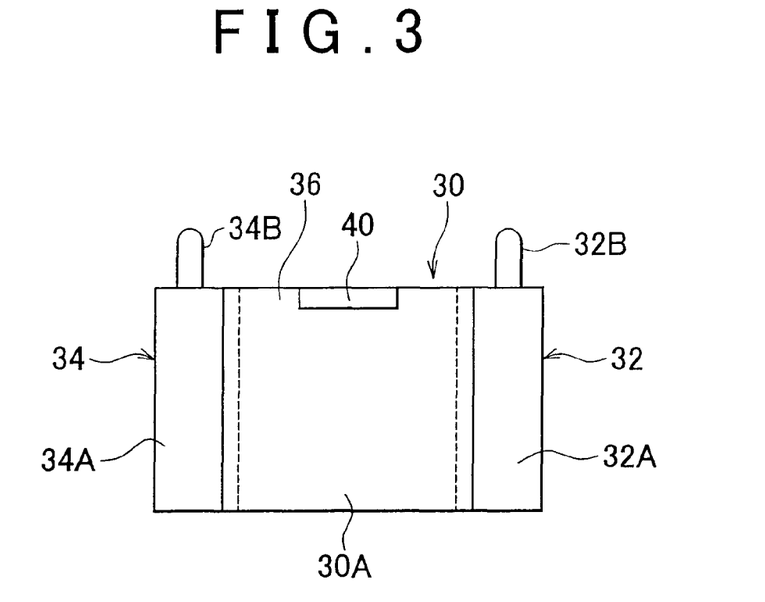
FIG. 3 is a front view schematically showing an example of rolled electrode body.

Next, the construction within the container 14 of each cell 12, which characterizes the present invention, will be described referring to the drawings. FIG. 3 is a front view of the rolled electrode body 30 housed in the container 14 as viewed from one flat major-surface side thereof. FIG. 4 is a cross-sectional view schematically showing a condition of the rolled electrode bodies 30 housed in the containers 14 of the respective cells 12 that are in a restrained state as shown in FIG. 2. As shown in FIG. 3, the rolled electrode body 30 is fabricated in a manner similar to rolled electrode bodies of lithium-ion batteries of the related art, by laminating a sheet-like anode collector (hereinafter referred to as "anode collector sheet") 32 and a sheet-like cathode collector (hereinafter referred to as "cathode collector sheet") 34 along with two sheet-like separators (hereinafter referred to as "separator sheets") 36, and rolling these sheets 32, 34, 36 while slightly displacing the anode collector sheet 32 and the cathode collector sheet 34 from each other in a direction perpendicular to the rolling direction. The thus obtained rolled structure is then pushed and squashed at its side faces into a relatively flat shape, thereby to provide the flat-shaped rolled electrode body 30.

As a result of rolling the sheets 32, 34, 36 while slightly displacing the anode collector sheet 32 and the cathode collector sheet 34 from each other in the direction perpendicular to the rolling direction of the rolled electrode body 30 in the manner as described above, an anode side edge 32A of the anode collector sheet 32 and a cathode side edge 34A of the cathode collector sheet 34 located on the opposite sides in the direction of the width of the rolled electrode body 30 (i.e., the lateral direction in FIG. 3) extend outwardly from a core portion 30A of the rolled electrode body 30. In the core portion 30A, a layer of an anode active material to be formed on the anode collector sheet 32, a layer of a cathode active material to be formed on the cathode collector sheet 34, and the separator sheets 36 are closely rolled together. A positive lead terminal 32B and a negative lead terminal 34B are provided on the anode-side edge 32A (on which the anode active-material layer is not formed) and the cathode-side edge 34A (on which the cathode active-material layer is not formed), respectively, and are electrically connected to the above-mentioned external positive terminal 15 and the external negative terminal 16, respectively.

The materials and components that constitute the rolled electrode body 30 may be similar to those of the electrode bodies of the lithium-ion batteries of the related art, and are not particularly limited. For example, the anode collector sheet 32 can be formed by applying a layer of an anode active material for a lithium-ion battery onto a long length of anode collector. An aluminum foil (used in this embodiment) or other metal foils suitable for the positive electrode may be used as the anode collector. One kind of substance or two or more kinds of substances used for lithium-ion batteries of the related art may be used as the anode active material, although it is not limited to any particular substances. For example, $LiMn_2O_4$, $LiCoO_2$, $LiNiO_2$, etc., may be used. On the other hand, the cathode collector sheet 34 can be formed by applying a layer of a cathode active material for a lithium-ion battery onto a long length of cathode collector. A copper foil (used in this embodiment) or other metal foils suitable for the negative electrode may be used as the cathode collector. One kind of substance or two or more kinds of substances used for lithium-ion batteries of the related art may be used as the cathode active material, although it is not limited to any particular substances. For example, carbon materials, such as graphite carbon and amorphous carbon, lithium-containing transition metal oxides and transition metal nitrides, and so forth may be used. The separator sheets 36 disposed between the anode and cathode collector sheets 32, 34 may be formed of a porous olefin resin.

In the present embodiment, after the anode collector sheet 32, cathode collector sheet 34 and two separator sheets 36 are laminated together to form the rolled electrode body 30 of a flat shape (typically, having an oval, spiral form in cross section), as shown in FIG. 3, a trailing edge 36E of the outermost sheet (one of the separator sheets 36 in this embodiment) located at the outer periphery of the rolled body is fixed to the outer surface of the rolled electrode body 30 with an adhesive tape 40 (made of a resin). With this arrangement, the rolled electrode body 30 is prevented from being loosened, and can be kept in a good rolled condition. The rolled electrode body 30 thus constructed is placed in the container 14, and a suitable electrolyte (for example, a non-aqueous electrolyte, such as a mixed solvent of diethyl carbonate and ethylene carbonate, which contains an appropriate amount of lithium salt, such as $LiPF_6$) is injected into and sealed in the container 14, thereby to provide the battery cell 12 according to the present embodiment. A plurality of such cells 12 (four cells in FIG. 4) is prepared, which constitute the battery module 10.

In each of the cells 12 of the battery module 10 according to the present embodiment, all of the trailing edges 32E, 34E, 36E and leading edges 32D, 34D, 36D of the sheets 32, 34, 36 that constitute the rolled electrode body 30 are positioned outside a portion of the rolled electrode body 30 which receives the restraining load, more specifically, the flat faces of the rolled electrode body 30 corresponding to the container major surfaces 14A that are in intimate contact with the space holding plates 18. Furthermore, the tape 40 is also positioned outside the above-mentioned flat faces.

Figure 5:
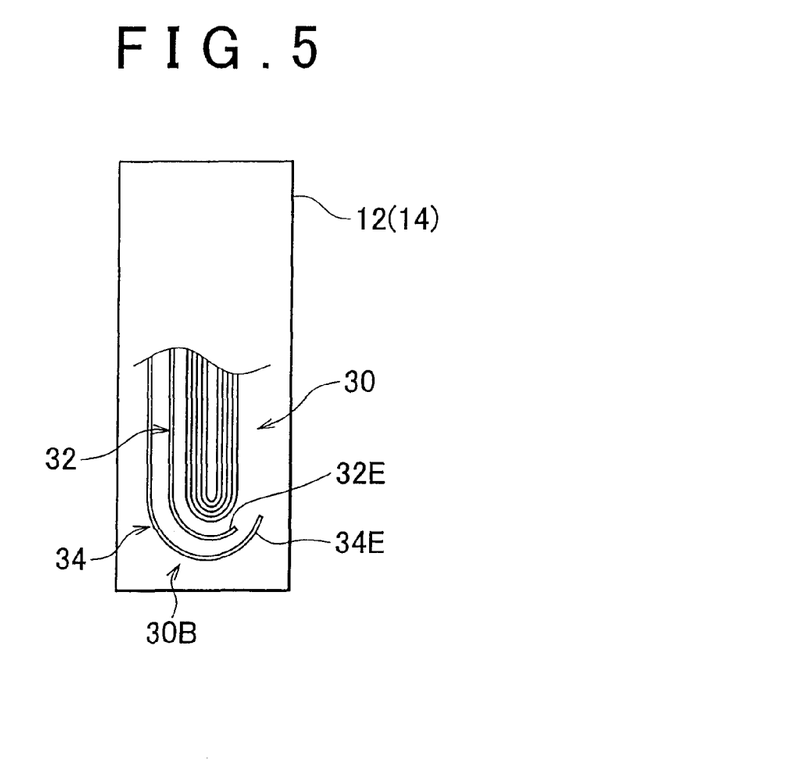
FIG. 5 is an explanatory view schematically showing a principal part of the rolled electrode body mounted in the battery module according to the above embodiment of the invention.
Figure 6:
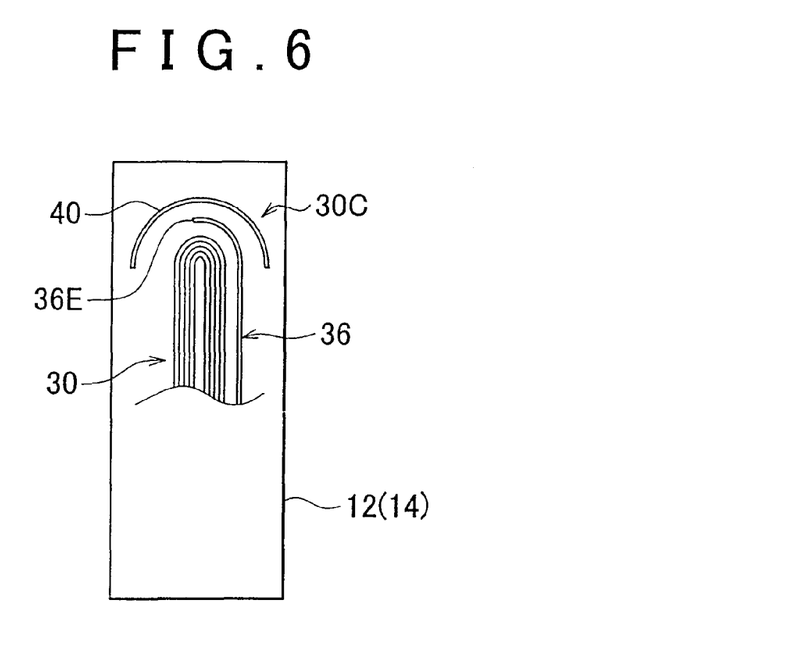
FIG. 6 is an explanatory view schematically showing a principal part of the rolled electrode body mounted in the battery module according to the above embodiment.
Figure 7:
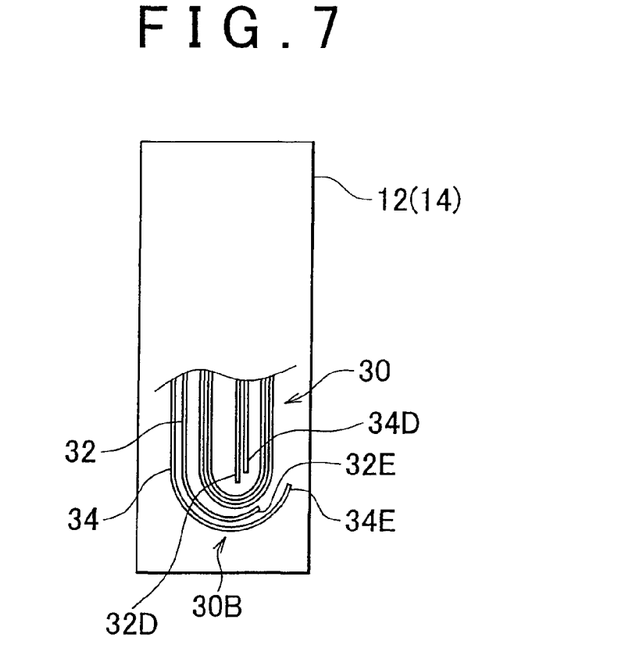
FIG. 7 is an explanatory view schematically showing a principal part of the rolled electrode body mounted in the battery module according to the above embodiment.
Figure 11:
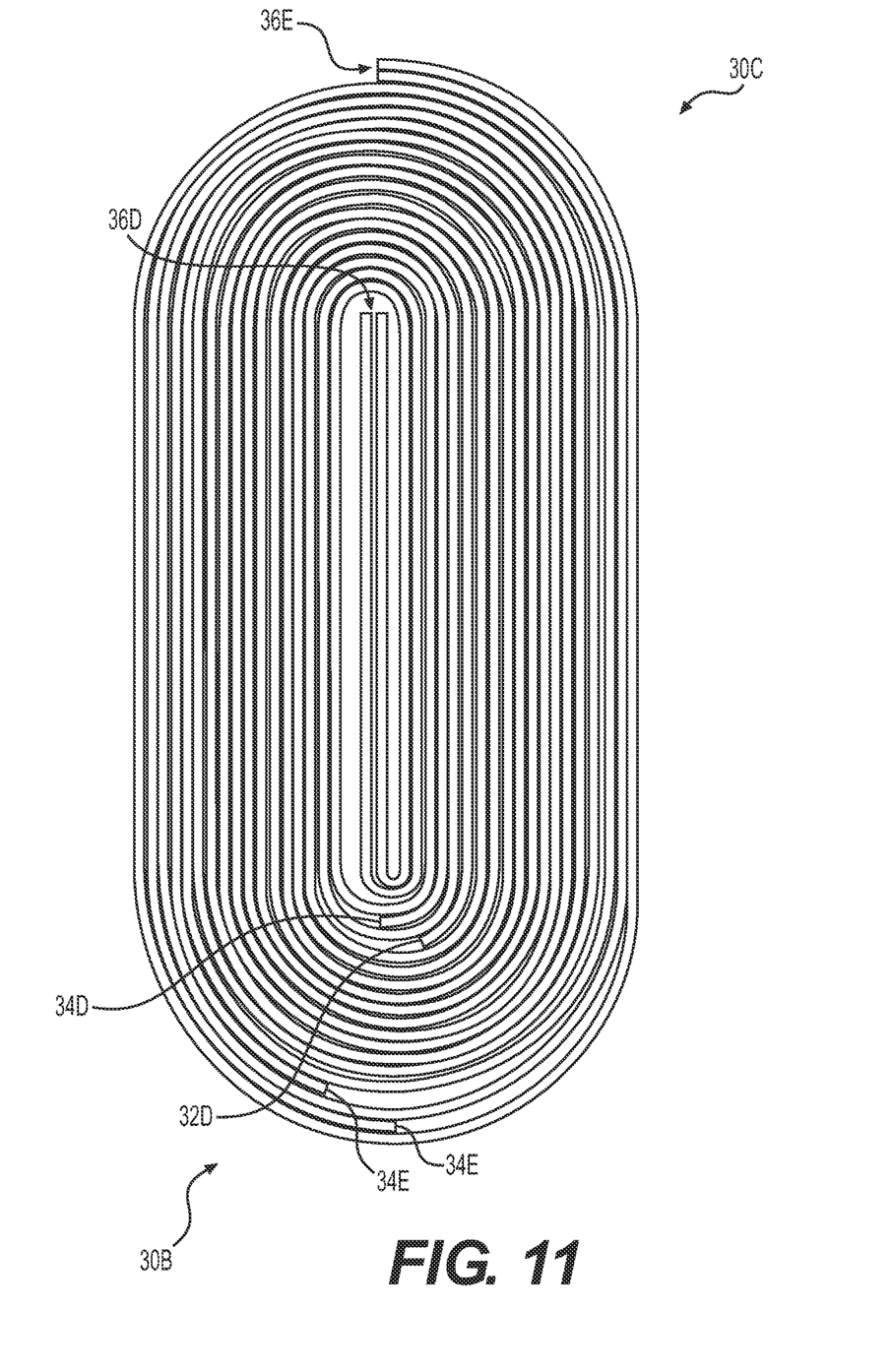
FIG. 11 is a view schematically showing a part of the rolled electrode body according to an embodiment of the invention.

More specifically, as described referring to FIG. 5 through FIG. 7 (in which portions that are not needed for explanation are eliminated or deformed), in the rolled electrode body 30 of the present embodiment, the trailing edge 32E of the anode collector sheet 32 and the trailing edge 34E of the cathode collector sheet 34 are positioned in one of opposite curved corner portions (R portions) 30B formed between the front and back flat faces (corresponding to the major surfaces of the core portion) of the rolled electrode body 30, as shown in FIG. 5. Similarly, the leading edge 32D of the anode collector sheet 32 and the leading edge 34D of the cathode collector sheet 34 are positioned in the above-mentioned curved corner portion 30B, as shown in FIG. 7. Also, in the rolled electrode body 30 of the present embodiment, the trailing edge 36E of one of the separator sheets 36 and the tape 40 are positioned in the other corner portion (R portion) 30C opposite to the corner portion 30B in which the trailing edges of the anode and cathode collector sheets are positioned, as shown in FIG. 6. In FIG. 6, the other separator sheet 36 is not illustrated. As shown in FIG. 11, the leading edges 36D of the separator sheets 36 are also positioned in the above-mentioned corner portion 30C.

Figure 8:
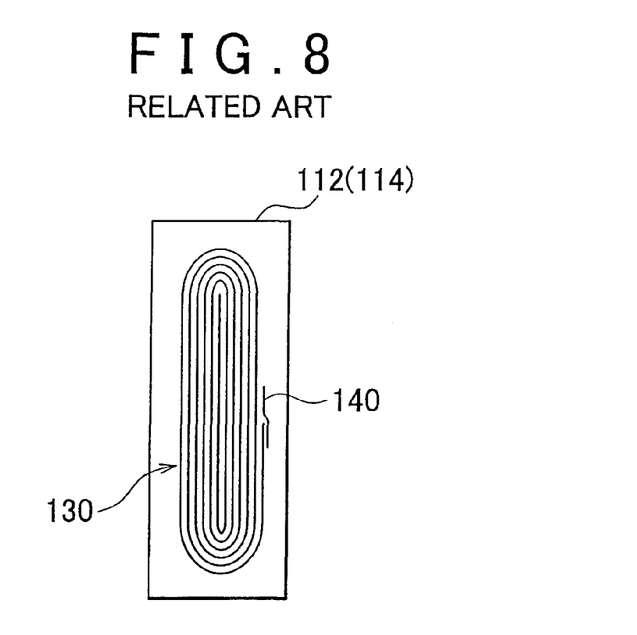
FIG. 8 is an explanatory view schematically showing a condition of a rolled electrode body of the related art, which is mounted in a battery module.
Figure 9:
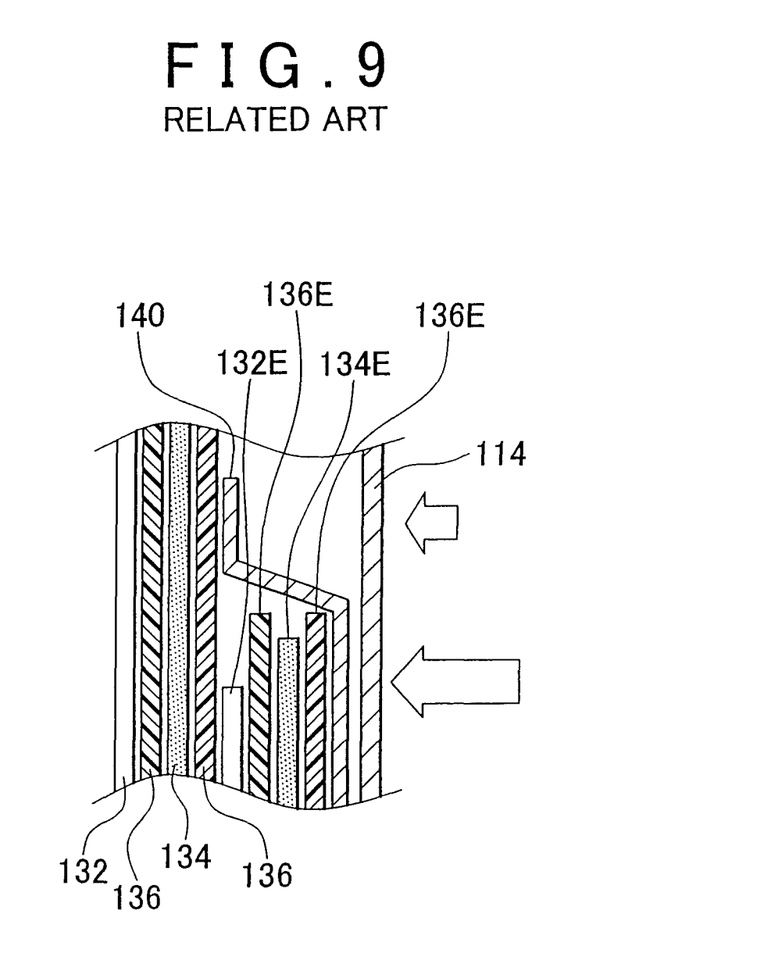
FIG. 9 is an explanatory view schematically showing a stepped surface portion of the rolled electrode body of the related art.
Figure 10:
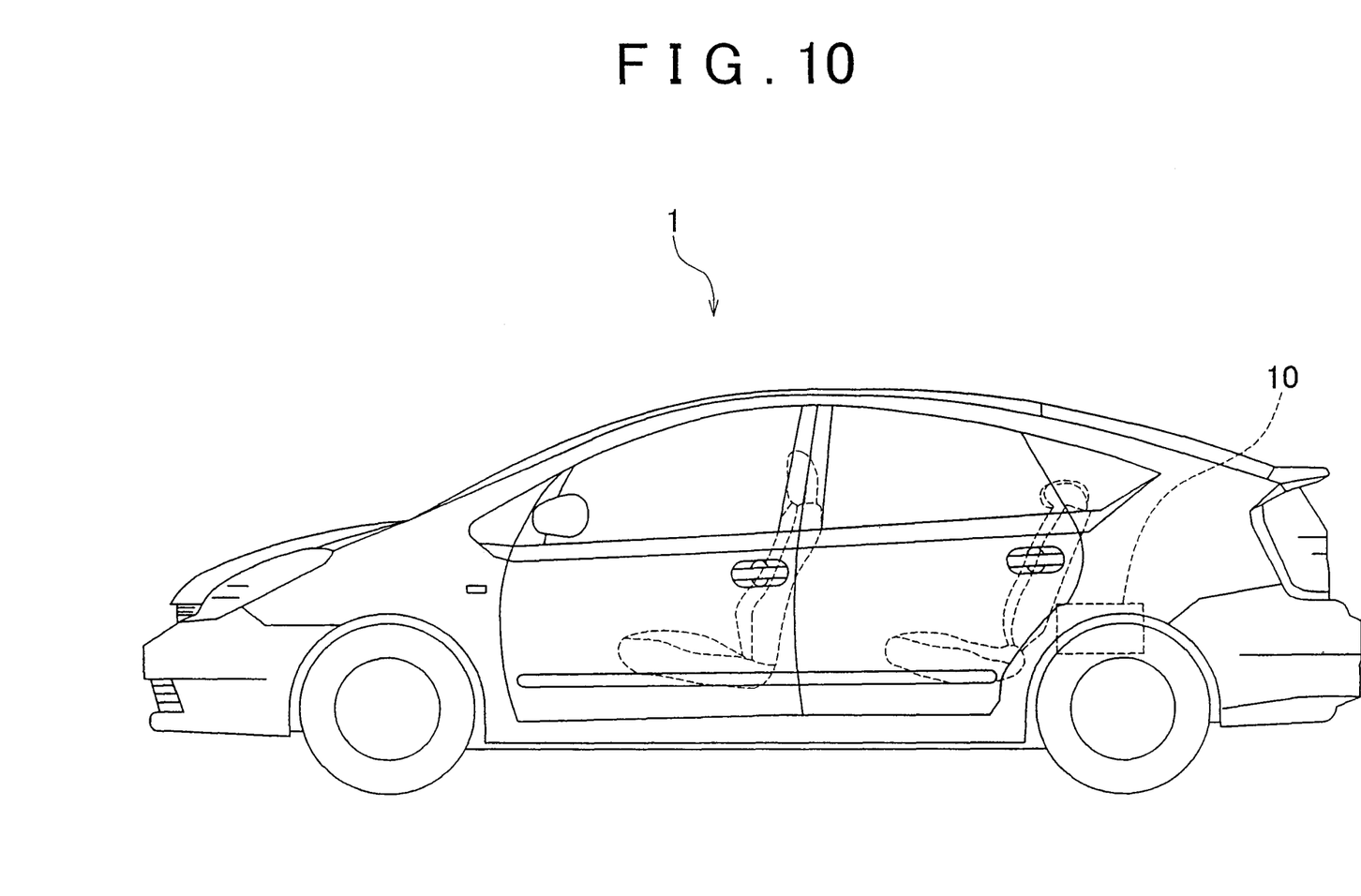
FIG. 10 is a side view schematically showing a vehicle (automobile) having the battery module of the invention.

As described above, all of the trailing edges 32E, 34E and leading edges 32D, 34D of the anode and cathode collector sheets 32, 34 that constitute the rolled electrode body 30 are positioned in the corner portion 30B, and all of the trailing edges 36E of the separator sheets 36 and the tape 40 are positioned in the corner portion 30C, so that no steps (i.e., projections and recesses) due to the presence of the edges of the respective sheets (or the tape) appear in the flat faces of the rolled electrode body 30 which receive the restraining load (surface pressure). Accordingly, unevenness in the restraining load (surface pressure), which would be encountered in a battery structure of the related art as shown in FIG. 8 and FIG. 9, can be prevented. In the battery structure of FIG. 8 and FIG. 9, a rolled electrode body 130 is placed in a container 114 of a cell 112, such that a trailing edge 132E of an anode collector sheet 132, a trailing edge 134E of a cathode collector sheet 134, trailing edges 136E of separator sheets 136 and a tape 140 are positioned in a portion (a flat face of the rolled electrode body 130 in this example) that substantially receives the restraining load. In this case, the restraining load (surface pressure) is unevenly applied to the rolled electrode body 130. If the restraining load (surface pressure) is applied unevenly as indicated by large and small arrows in FIG. 9, the pressure applied to the interior of the rolled electrode body 130 varies from portion to portion, resulting in uneven distribution of the electrolyte (electrolytic solution). As a result, some portions in the rolled electrode body 130 may be subjected to a high load upon charging and discharging of the cell, resulting in deterioration of the cycle life performance (service life) of the cell. In the battery module 10 of the present embodiment, on the other hand, the restraining load (surface pressure) is evenly or uniformly applied to the rolled electrode body 30 (or its flat faces) in each cell 12, and therefore, no problem occurs due to the unevenness in the restraining load (surface pressure) as described above. Thus, the battery module 10 of this embodiment has excellent cycle life performance and output characteristics, and achieves long service life. Also, where at least one of the trailing edges (and, preferably, leading edges) of the three types of sheets 32, 34, 36 is positioned in one of the corner portions 30B while the remaining trailing edge(s) (and, preferably, leading edge(s)) of the three types of sheets 32, 34, 36 are positioned in the other corner portion 30C, as in the present embodiment, concentration of the sheet edges in one of the corner portions can be avoided, and problems, such as distortion of the outer shape of the rolled electrode body 30, which would be caused by the concentration can be prevented in advance.

In the following, the operation and effects of the invention will be explained with reference to test examples. Initially, an anode collector sheet was prepared by forming a layer of an anode active material (88% by mass of lithium nickel oxide, 10% by mass of acetylene black, 1% by mass of polytetrafluoroethylene, and 1% by mass of carboxymethyl cellulose) for a lithium-ion battery, which contains lithium nickel oxide as a main component, on a specified region of a surface of an aluminum foil having a length of 2.7 m, a width of 10 cm and a thickness of 15 μm, by an ordinary method. Also, a cathode collector sheet was prepared by forming a layer of a cathode active material (98% by mass of graphite, 1% by mass of styrene-butadiene rubber, and 1% by mass of carboxymethyl cellulose) for a lithium-ion battery, which contains graphite as a main component, on a specified region of a surface of a copper foil having a length of 2.9 m, a width of 10 cm and a thickness of 10 μm, by an ordinary method. These anode and cathode collector sheets were rolled (20 turns) along with two separator sheets made of polyethylene, each having a length of 3.1 m, a width of 11 cm and a thickness of 25 μm, and the resulting rolled structure was pushed and squashed, to thereby provide a flat-shaped rolled electrode body for a lithium-ion battery, for use in the test examples. Like the rolled electrode body 30 as shown in FIG. 3, a trailing edge of the separator sheet as the outermost sheet was secured to the outer circumferential surface of the rolled body using an adhesive tape made of polypropylene. In the test examples, a total of five types of samples were prepared, using the flat-shaped rolled electrode body as described above, such that the respective types of samples were different from one another in terms of the following three conditions: (1) the trailing edges of the anode and cathode collector sheets are positioned in a middle region (flat face) of the rolled electrode body or in a corner portion, (2) the trailing edges of the separator sheets are positioned in a middle region (flat face) of the rolled electrode body or in a corner portion, and (3) the leading edges of the anode and cathode collector sheets are positioned in a middle region of the rolled electrode body or in a corner portion, as indicated in TABLE 1 below.

Positive and negative lead terminals were welded to the rolled electrode body thus prepared, and the rolled electrode body was placed in a box-like container made of aluminum and having a shape corresponding to that of the rolled electrode body. A suitable amount of electrolytic solution (a non-aqueous electrolyte prepared by dissolving $LiPF_6$ as a lithium salt in a concentration of 1 M in a mixed solvent of ethylene carbonate, ethyl methyl carbonate, and dimethyl carbonate having a mass ratio of 1:1:1) was injected into the container and sealed therein. In this manner, a total of five types of lithium-ion batteries corresponding to the above-indicated five types of samples (see TABLE 1) were prepared. Subsequently, for each sample battery, a restraining structure as shown in FIG. 1 was attached to the outside of the container, so that a certain restraining load (surface pressure: about $4.0 \times 10^6$ Pa) was applied to the flat faces of the rolled electrode body in the direction of the thickness thereof.

With regard to each sample battery held in the restricted state as described above, the cycle life performance and output performance were investigated, and the effects of the present invention associated with the performance of the battery (in particular, the output characteristics and service life) were evaluated. More specifically, after an appropriate conditioning process was carried out, each sample battery was discharged at a constant current until the voltage reached 3.0 V, under a temperature condition of 25° C., and then charged at a constant current and constant voltage, so that the state of charge (SOC) was controlled to 50%. Thereafter, the battery was discharged at 25° C. at some currents selected from the range of 10 to 100 A, and a graph of I-V characteristics of the sample battery was plotted. Here, the discharge cut-off voltage was set to 3.0 V. Then, a 10-second output value was determined from the graph of the I-V characteristics. Next, each sample battery was charged at a constant current (10 A) with the voltage varying from 3.0 V to 4.1 V, under a temperature condition of 60° C., and was subsequently discharged at a constant current (10 A) until the voltage reached 3.0 V. This charge-discharge cycle was repeated 10,000 times. Thereafter, the battery was charged at a constant current and a constant voltage, so that the state of charge (SOC) was controlled to 50%. Then, a graph of I-V characteristics was plotted in the same manner as described above, and a 10-second output value after 10,000 cycles of charge and discharge was determined from the graph. Then, the percentage of the 10-second output value after 10,000 cycles of charge and discharge with respect to the 10-second output value after the initial charge was obtained as an output retention rate (%). The results of the cycle life test are shown in TABLE 1.

TABLE 1

|  | Position of trailing edges of anode and cathode collector sheets | Position of trailing edges of separator sheets and tape | Position of leading edges of anode and cathode collector sheets | Output retention rate (%) (after 10,000 cycles) |
|---|---|---|---|---|
| Sample 1 | middle region | middle region | middle region | 71 |
| Sample 2 | corner portion | middle region | middle region | 82 |
| Sample 3 | middle region | corner portion | middle region | 75 |
| Sample 4 | middle region | middle region | corner portion | 78 |
| Sample 5 | corner portion | corner portion | corner portion | 85 |

As is apparent from the results shown in TABLE 1, the output retention rate was improved by placing the trailing edges of the anode and cathode collector sheets at a position (one of the corner portions in the test examples) that lies outside a portion (flat faces) of the rolled electrode body which substantially receives the restraining load. As is also apparent from the results shown in TABLE 1, the output retention rate was further improved by placing the leading edges of the anode and cathode collector sheets and/or the trailing edges of the separator sheets (and tape) at a position (the other corner portion in the test examples) that lies outside the portion of the rolled electrode body which substantially receives the restraining load.

While the invention has been described with reference to exemplary embodiments thereof, it is to be understood that the invention is not limited to the described embodiments or constructions. To the contrary, the invention is intended to cover various modifications and equivalent arrangements. In addition, while the various elements of the exemplary embodiments are shown in various combinations and configurations, other combinations and configurations, including more, less or only a single element, are also within the spirit and scope of the invention.

The invention claimed is:

1. A battery module constructed such that a plurality of cells capable of charging and discharging are connected in series, wherein:

each of the cells includes a flat-shaped rolled electrode body formed by rolling a sheet-like anode collector and a sheet-like cathode collector along with a sheet-like separator;

at least two of the cells that are adjacent to each other are arranged such that flat faces of the rolled electrode bodies included in the respective cells are opposed to each other, and are held in a restrained condition in which a restraining load is applied to the rolled electrode bodies in a direction of arrangement of the cells;

in the rolled electrode body included in each of said at least two cells, a trailing edge of the sheet-like anode collector located at an outside of the rolled electrode body and a trailing edge of the sheet-like cathode collector located at the outside of the rolled electrode body are positioned at a first corner portion of each cell, the first corner portion being outside a portion of the rolled electrode body which substantially receives the restraining load, and a trailing edge of the sheet-like separator is positioned at a second corner portion of each cell outside the portion of the rolled electrode body which substantially receives the restraining load, the second corner portion being opposite the first corner portion; and in the rolled electrode body included in each of said at least two cells, a leading edge of the sheet-like anode collector and a leading edge of the sheet-like cathode collector are both positioned at one of the first corner portion and the second corner portion of each cell outside the portion of the rolled electrode body which substantially receives the restraining load, and a leading edge of the sheet-like separator is positioned at another of the first corner portion and the second corner portion of each cell.

2. The battery module according to claim 1, wherein:

a space holding plate is disposed between adjacent ones of said at least two cells, said space holding plate being held in a restrained condition in which the restraining load is applied to the space holding plate as well as the corresponding cells in the direction of arrangement of the cells; and in the rolled electrode body of each of said at least two cells, the trailing edge of the sheet-like anode collector and the trailing edge of the sheet-like cathode collector are both positioned outside a portion of the rolled electrode body which can be pressed by the space holding plate.

3. The battery module according to claim 1, wherein the trailing edge of the sheet-like anode collector and the trailing edge of the sheet-like cathode collector are both positioned outside the opposed flat faces of the corresponding rolled electrode bodies.

4. The battery module according to claim 1, wherein in the rolled electrolyte body included in each of said at least two cells, a tape that fixes at least one of the trailing edge of the sheet-like anode collector, the trailing edge of the sheet-like cathode collector and the trailing edge of the sheet-like separator to an outer surface of the rolled electrode body is positioned outside the portion of the rolled electrode body which substantially receives the restraining load.

5. The battery module according to claim 4, wherein the tape surrounds a portion of the rolled electrode body disposed in either the first or second corner portion of each cell.

6. A vehicle comprising the battery module as defined in claim 1.

7. A method of fabricating a battery module in which a plurality of cells capable of charging and discharging are connected in series, comprising:

preparing at least two cells each having a flat-shaped rolled electrode body formed by rolling a sheet-like anode collector and a sheet-like cathode collector along with a sheet-like separator; and arranging said at least two cells such that flat faces of the rolled electrode bodies included in adjacent ones of the cells are opposed to each other, and holding the cells in a restrained condition in which a restraining load is applied to the rolled electrode bodies in a direction of arrangement of the cells, wherein in the rolled electrode body included in each of said at least two cells, a trailing edge of the sheet-like anode collector located at an outside of the rolled electrode body and a trailing edge of the sheet-like cathode collector located at the outside of the rolled electrode body are positioned at a first corner portion of each cell, the first corner portion being outside a portion of the rolled electrode body which substantially receives the restraining load, and a trailing edge of the sheet-like separator is positioned at a second corner portion of each cell outside the portion of the rolled electrode body which substantially receives the restraining load, the second corner portion being opposite the first corner portion, and in the rolled electrode body included in each of said at least two cells, a leading edge of the sheet-like anode collector and a leading edge of the sheet-like cathode collector are both positioned at one of the first corner portion and the second corner portion of each cell outside the portion of the rolled electrode body which substantially receives the restraining load, and a leading edge of the sheet-like separator is positioned at another of the first corner portion and the second corner portion of each cell.

* * * * *